(12) United States Patent
Lublinsky et al.

(10) Patent No.: US 10,002,156 B2
(45) Date of Patent: Jun. 19, 2018

(54) VERSION MANAGEMENT FOR INCREMENTALLY COMPILED MAP DATA

(71) Applicant: HERE Global B.V., Veldhoven (NL)

(72) Inventors: Boris Lublinsky, Chicago, IL (US); Vladimir Zhukov, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 369 days.

(21) Appl. No.: 14/658,455

(22) Filed: Mar. 16, 2015

(65) Prior Publication Data

US 2016/0275131 A1    Sep. 22, 2016

(51) Int. Cl.
| | |
|---|---|
| G06F 17/00 | (2006.01) |
| G06F 17/30 | (2006.01) |
| G01C 21/36 | (2006.01) |
| G06T 1/60 | (2006.01) |

(52) U.S. Cl.
CPC ... *G06F 17/30371* (2013.01); *G01C 21/3667* (2013.01); *G06F 17/30241* (2013.01); *G06F 17/30876* (2013.01); *G06T 1/60* (2013.01)

(58) Field of Classification Search
CPC ......... G06F 17/30371; G06F 17/30241; G06F 17/30876; G06T 1/60; G01C 21/3667
USPC ......................................................... 707/695
See application file for complete search history.

(56) References Cited

U.S. PATENT DOCUMENTS

| | | | |
|---|---|---|---|
| 5,729,731 A * | 3/1998 | Yajima | G06F 17/30241 |
| 5,893,113 A | 4/1999 | McGrath et al. | |
| 6,121,924 A | 9/2000 | Meek et al. | |
| 6,601,073 B1 | 7/2003 | Robare | |
| 7,082,443 B1 * | 7/2006 | Ashby | G01C 21/32 |
| | | | 342/357.41 |
| 7,099,882 B2 | 8/2006 | McDonough | |
| 7,403,851 B2 | 7/2008 | Kaufman et al. | |
| 7,831,383 B2 * | 11/2010 | Oohashi | G01C 21/32 |
| | | | 701/420 |
| 7,974,959 B2 * | 7/2011 | Sawai | G01C 21/32 |
| | | | 701/532 |
| 8,005,612 B2 * | 8/2011 | Asahara | G01C 21/32 |
| | | | 340/988 |

(Continued)

FOREIGN PATENT DOCUMENTS

| | | |
|---|---|---|
| EP | 1473543 A2 | 11/2004 |
| WO | WO2010024873 A1 | 3/2010 |

OTHER PUBLICATIONS

Davis, Jr., Clodoveu A., et al., "OGC Web Map Service Implementation Challenges for Mobile Computers", Geoinformatics 2009, Fairfax, VA, Aug. 12-14, 2009, 6 pages.*

(Continued)

*Primary Examiner* — Robert Stevens
(74) *Attorney, Agent, or Firm* — Lempia Summerfield Katz LLC

(57) ABSTRACT

A map developer may maintain multiple versions of a geographic database including map tile data. Map tile data may be organized according to a versioning schema. A server, or an endpoint device in communication with the server, may receive a request for map data for a tile associated with a tile identifier and access a tile compatibility table with the tile identifier. The tile compatible table includes multiple tile version identifiers for the tile indexed by global map version identifiers and returns a compatible tile identifier and a compatible map version in response to the request for map data.

20 Claims, 10 Drawing Sheets

(56) References Cited

U.S. PATENT DOCUMENTS

| | | | | |
|---|---|---|---|---|
| 8,014,796 B2* | 9/2011 | Boudreau | ............... | G01C 21/32 340/995.1 |
| 8,521,424 B2* | 8/2013 | Schunder | ............... | G01C 21/32 701/452 |
| 8,521,430 B2 | 8/2013 | Davis et al. | | |
| 8,711,181 B1* | 4/2014 | Nourse | ............... | G06F 3/14 345/660 |
| 9,171,464 B2* | 10/2015 | Khetan | ............... | G08G 1/0962 |
| 2002/0067379 A1* | 6/2002 | Kenyon | ............... | G06F 17/30241 715/838 |
| 2004/0220957 A1* | 11/2004 | McDonough | ..... | G06F 17/30241 |
| 2005/0270311 A1* | 12/2005 | Rasmussen | ............... | G01C 21/32 345/677 |
| 2009/0171558 A1* | 7/2009 | Davis | ............... | G01C 21/32 701/532 |
| 2012/0209818 A1* | 8/2012 | Richter | ............... | G06F 17/30371 707/690 |
| 2013/0117322 A1* | 5/2013 | Fischer | ............... | G06F 17/30289 707/792 |
| 2013/0147846 A1* | 6/2013 | Kalai | ............... | G06T 1/60 345/660 |
| 2013/0332058 A1* | 12/2013 | Prestor | ............... | G08G 1/0962 701/118 |
| 2013/0332069 A1* | 12/2013 | Schunder | ............... | G01C 21/26 701/430 |
| 2014/0136099 A1* | 5/2014 | Choi | ............... | G01C 21/32 701/453 |
| 2014/0184591 A1* | 7/2014 | Boschker | ............... | G06T 15/50 345/419 |
| 2015/0170386 A1* | 6/2015 | Chawathe | ............... | G06T 1/20 345/634 |
| 2015/0170387 A1* | 6/2015 | Chawathe | ............... | G06T 17/05 345/635 |
| 2015/0170388 A1* | 6/2015 | Chawathe | ............... | G06T 11/60 345/629 |
| 2015/0186443 A1* | 7/2015 | Ito | ............... | G06F 17/30241 707/618 |
| 2015/0286741 A1* | 10/2015 | Zhu | ............... | G06F 17/30241 707/736 |
| 2015/0347457 A1* | 12/2015 | Zhu | ............... | G06F 17/30241 707/743 |
| 2015/0356118 A1* | 12/2015 | Kalai | ............... | G06T 1/60 345/520 |
| 2015/0370828 A1* | 12/2015 | Maurer | ............... | G06F 17/30061 707/722 |

OTHER PUBLICATIONS

Liu, Yiming, et al., "Scalable and Mashable Location-Oriented Web Services", ICWE 2010, LNCS 6189, Springer-Verlag, Berlin, Germany, © 2010, pp. 307-321.*

Schmidt, Manuela, et al., "Chapter 2: Web Mapping Services: Development and Trends", in Online Maps with APIs and WebServices, M. Peterson (ed.), Springer-Verlag, Berlin, Germany, © 2012, pp. 13-21.*

Microsoft Computer Dictionary, 4th Edition, Microsoft Press, Redmond, WA, © 1999, p. 232.*

Merriam Webster's Collegiate Dictionary, 10th Edition, Merriam-Webster, Inc., Springfield, MA, © 2000, pp. 66, 588-589 and 752.*

Microsoft Computer Dictionary, 5th Edition, Microsoft Press, Redmond, WA, © 2002, pp. 269-270 and 510.*

European Search Report for related European Application No. 16160538.1 dated Jul. 21, 2016 8 pages.

* cited by examiner

| Requested Version | Tile Layer Version | Compatible Tile Layer Version |
|---|---|---|
| V5 | V1 | V11 |
| V15 | V12 | V23 |
| V32 | V27 | V34 |
| V50 | V48 | V55 |

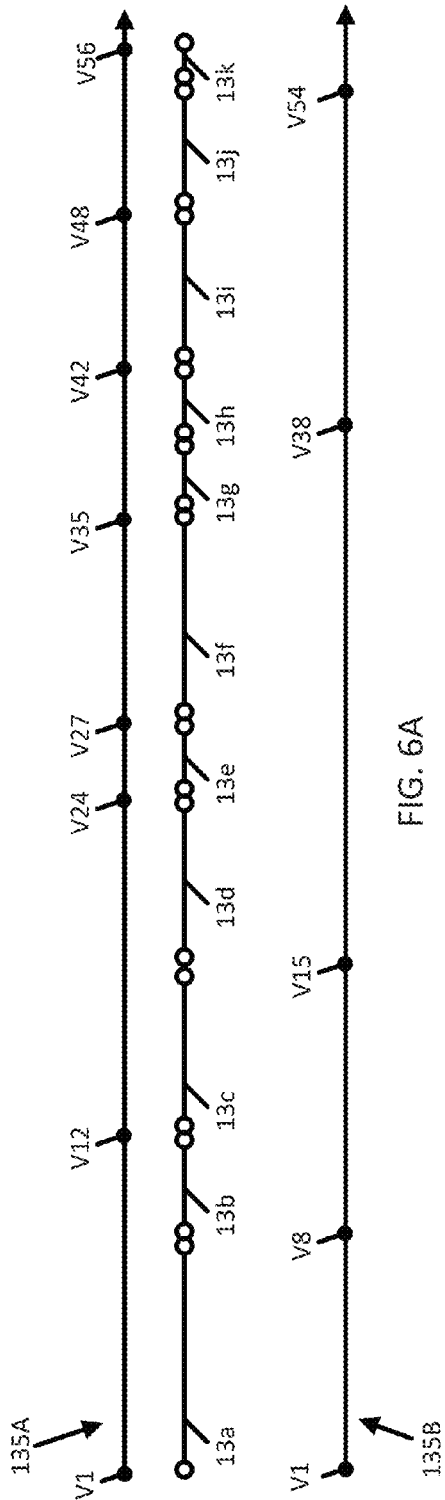

VERSION MANAGEMENT FOR INCREMENTALLY COMPILED MAP DATA

FIELD

The following disclosure relates to version management, and more particularly to version management for incrementally compiled map data or incremental updates of a geographic database.

BACKGROUND

Map data or geographic data are used in computer based systems that provide useful features to users. For example, the identification of routes to destinations or points of interests. A navigation system determines the optimum route to be taken by the end user to travel from the origin to the destination location from map data stored in a map database. Similarly, the navigation system may query the map data for nearby points of interest.

Map data is compiled first and then is distributed to the customers in a form of a data service where data is typically partitioned to allow individual customers to access on the data that they actually need.

As new roads are built, other roads are closed, or locations of business are changed, the geographic data is changing. When it comes to compilation of this data, there are at least two possible approaches. One way is to recompile all map data and replace the entire existing map with a new version containing new, updated map data. Another way is to do incremental compilation updating only certain portions of the map data incrementally.

Although both approaches are possible an important consideration for compilation is the fact that typically map data service needs to expose multiple versions of data, because different clients might not be able to update version of the map data that they are using and need to just upload additional tiles corresponding to the map version that they are already using. Because, in reality, not all the tiles include changes, incremental compilation saves a significant amount of space for storing tiles. This approach however creates a problem of maintain consistency between tiles with a different versions.

SUMMARY

In one embodiment, a request for map data for a tile associated with a tile identifier is received, and in response, a processor accesses a tile compatibility table with the tile identifier. Tile compatible table includes a plurality of tile version identifiers for the tile indexed by a single monotonically ascending map version number. A compatible tile identifier and data indicative of a compatible map version are received from the tile compatibility table. The compatible tile and the compatible map version are provided in response to the request for map data.

In one embodiment, a single monotonically ascending map version number is assigned to a map starting from an initial value. The single monotonically ascending map version number single monotonically ascending map version number is incremented in response to an update to any tile or set of tiles of the map. The map tile is assigned a version corresponding to the single monotonically ascending map version number for the map when the map tile is updated or created. When a request for map data is received for a tile associated with a tile identifier, a tile compatibility table is accessed using the tile identifier. The tile compatible table includes a plurality of tile version identifiers for the tile indexed by the single monotonically ascending map version identifiers.

BRIEF DESCRIPTION OF THE DRAWINGS

Exemplary embodiments of the present invention are described herein with reference to the following drawings.

FIG. 6A illustrates a set of overlapping sequential diagrams for map versions.
FIG. 6B illustrates a chart for the overlapping sequential diagrams of FIG. 6A.

DETAILED DESCRIPTION

Geographic databases or sets of map data may be updated by wholesale replacement of the data or portions of the data. The map data may be updated incrementally on demand. Map users and application developers may make specific requests for updates. Alternatively, map updates are delivered on a periodic schedule. Because the map users and application developers may choose different update sequences, separate versions of the map data are maintained by a map developer.

Consider a scenario in which a version of the geographic database is released by the map developer every quarter. Some entities may update the geographic database as frequently as possible and request the quarterly updates every quarter from the map developer. Other entities may request updates semiannually or annually.

In addition, a map user or an application developer may opt to update portions of a map while leaving other portions of the map in a previous version. Portions of a map may be updated as needed based on usage. Portions of the map may be updated when possible because of network availability.

The map data may be organized in tiles. In the case of incremental compilation of the spatial map data tiles with the different versions might or might not be compatible. Map users and application developers need to be able to access the set of tiles covering a certain area which are compatible to each other and to the tiles that a client or applications already has.

The following embodiments provide techniques for managing the versions of map data tiles for distribution to clients allowing to reason about compatibility of tiles with different version numbers. A version compatibility table tracks updates for individual tiles in the map, which may be numbered relative to a global index (e.g., a single monotonically ascending map version number) for the map. The global index extends from 1 to the current map version, which has no upper limit and may be infinite. An update of one or more tiles (transaction) increments a global map version and assigns this version to all tiles participating in transaction. The version compatibility table tracks the updates applied to the tiles. Using this global map version, map users and application developers can determine whether one tile of the map is compatible with another tile of the map.

Additionally such versioning schema allows map users and application developers to determine which tiles (map areas) have changed between versions. The versioning schema is the structure of the data or database that associates map tiles with the global index value. The versioning schema may be included with each map tile. When an application programming interface (API) or other program requests map tiles, the compatibility of the map tiles is checked using the versioning schema.

Figure 1:
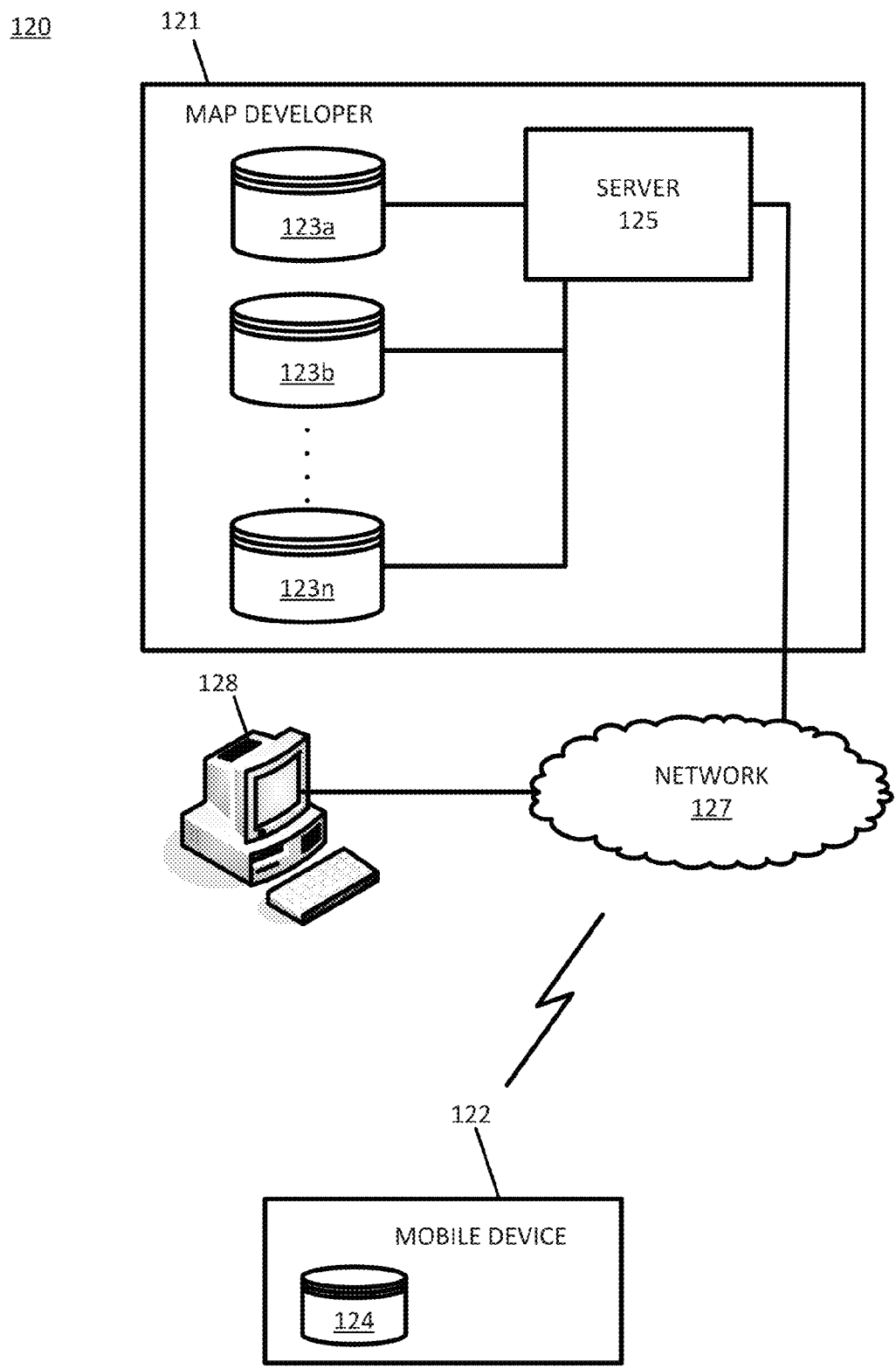
FIG. 1 illustrates an example system for version management.

FIG. 1 illustrates an example map developer system 120 for updating navigation databases. The system 120 includes a developer system 121, one or more mobile devices 122 (navigation devices), a workstation 128, and a network 127. Additional, different, or fewer components may be provided. For example, many mobile devices 122 and/or workstations 128 connect with the network 127. The developer system 121 includes a server 125 and one or more databases. The server 125 may maintain multiple map databases 123a, 123b . . . 123n. The term database and map database refers to a set of data or map data stored in a storage medium and may not necessarily reflect specific any requirements as to the relational organization of the data or the map data. The term server is used herein to collectively include the computing devices at the map developer for creating, maintaining, and updating the multiple databases 123a-n. Any computing device may be substituted for the mobile device 122. The computing device may be a host for a website or web service such as a mapping service or a navigation service. The mapping service may provide maps generated from the geographic data of the databases 123a-n, and the navigation service may calculate routing or other directions from the geographic data of the databases 123a-n.

The database 123a-n may be a geographic database including road segments. As shown in FIG. 1, a master copy of the database 123a may be stored at the developer system 121, and the databases 123b-n may include alternative versions or past versions of the database. The master copy of the database 123a may be the most current or up to date copy of the database. In addition, the mobile device 122 may store a local copy of the database 124. In one example, the local copy of the database 123b is a full copy of the geographic database, and in another example, the local copy of the database 124 may be a cached or partial portion of the geographic database.

The local of the database 124 may include data from various versions of the database 123a-n. The cached portion may be defined based on a geographic location of the mobile device 122 or a user selection made at the mobile device 122. The server 125 may send map updates to the mobile device 122.

Figure 2:
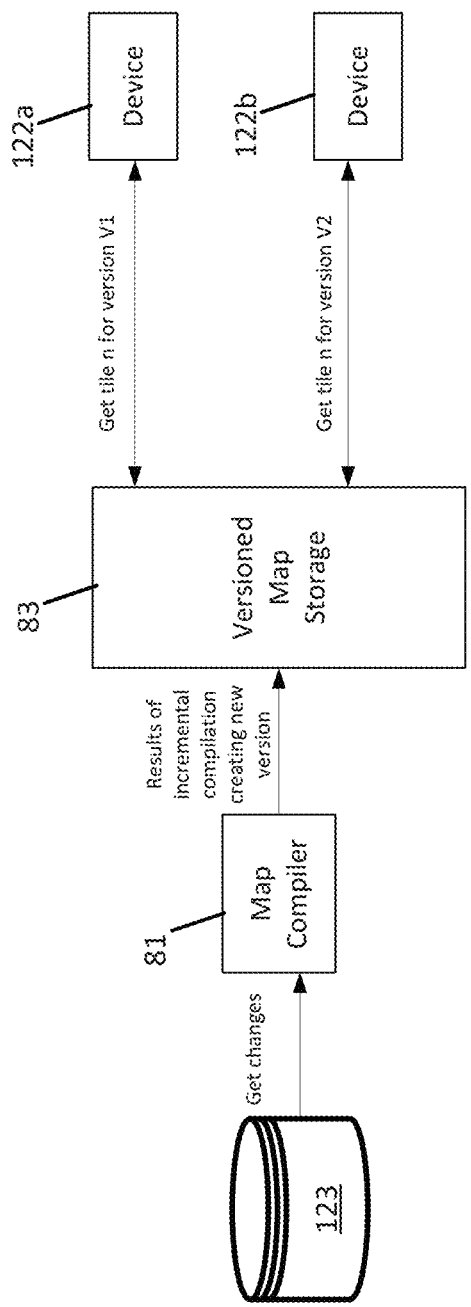
FIG. 2 illustrates an example of populating and using versioned map data storage.

FIG. 2 illustrates an example of populating and using versioned map data storage. Here a map compiler 81 periodically reads data from the map database 123 and compiles the data. The results of compilation updates map data stored in a versioned map storage device 83. This allows devices 122a and 122b to receive the same tile for different versions of a map tile, which actually might be a same physical tile if it has not changed from version V1 to V2.

Figure 3:
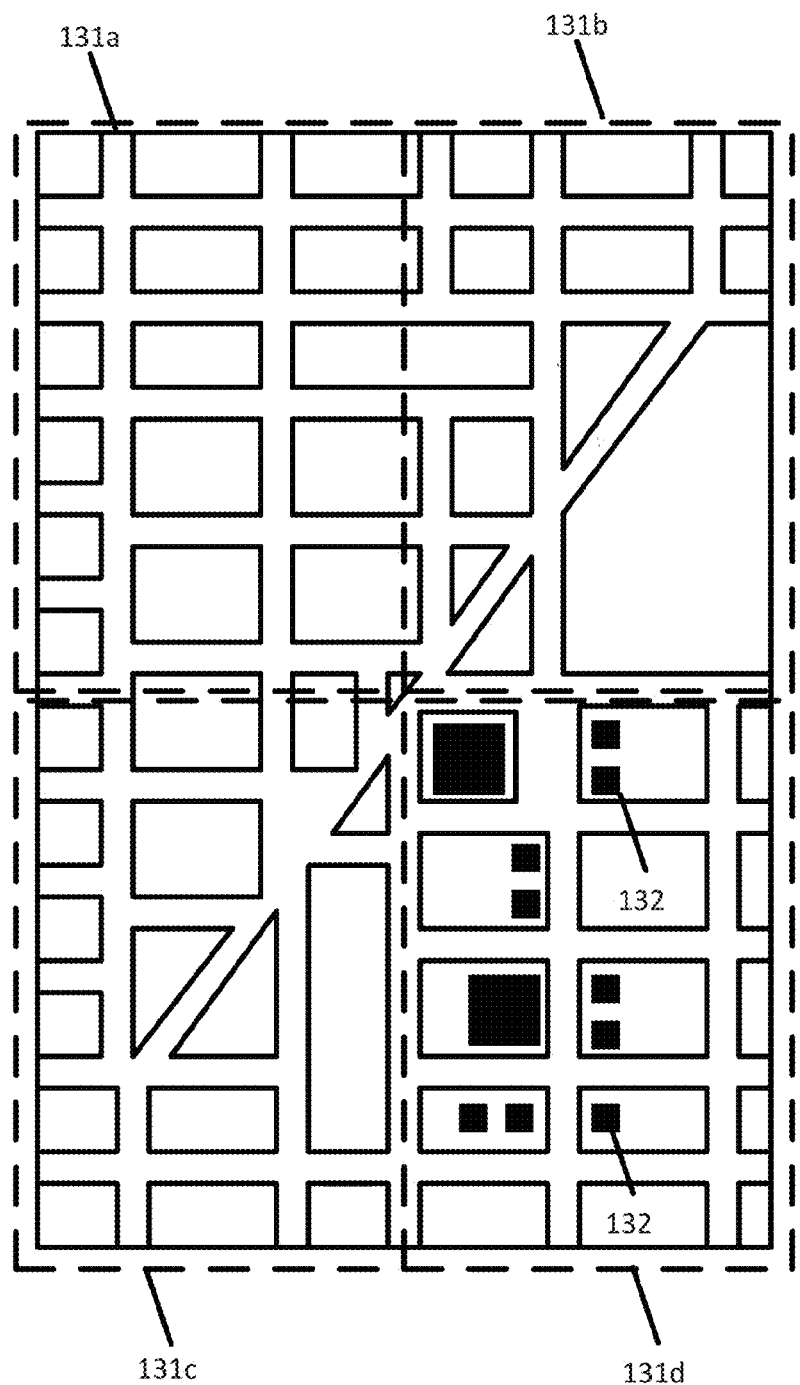
FIG. 3 illustrates an example map with multiple layers.
Figure 4:
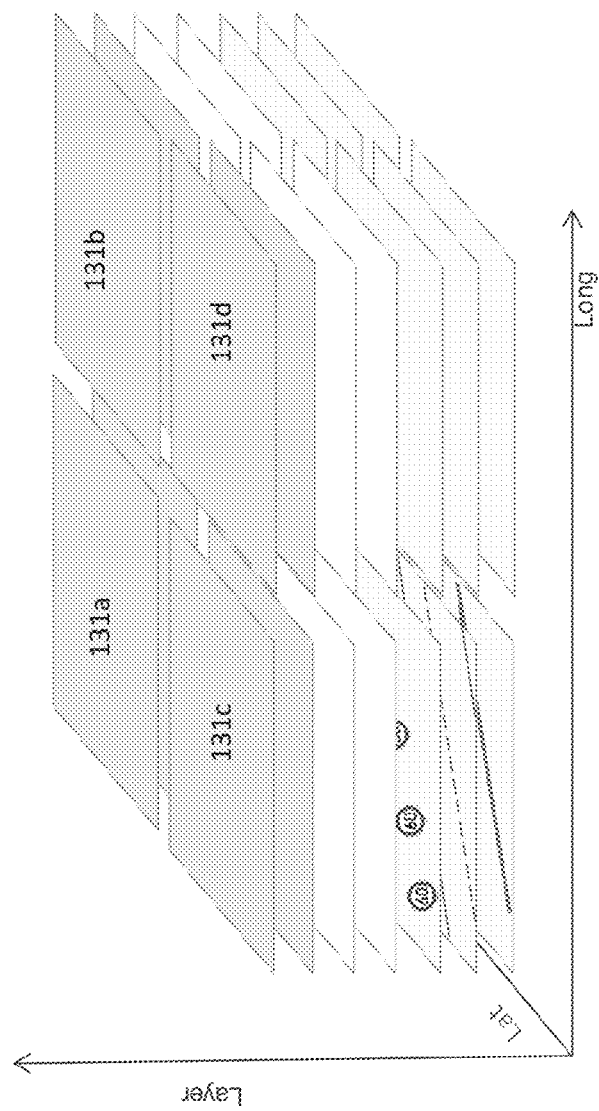
FIG. 4 illustrates another example map with multiple layers.

FIG. 3 illustrates horizontally spaced tiles, or horizontal layers, and vertical layers for the geographic databases or data sets. FIG. 4 illustrates a three-dimensional chart 90 that illustrates the horizontal layers and vertical layers. The horizontal layers may correspond to different geographic areas, as shown by horizontal layers for map tiles 131a-d and may represent spatial partitioning of the map data. The vertical layers may correspond to various types of data. One or more horizontal layers and one or more vertical layers may be combined to form a map. One example layer corresponds to road segments. Another example layer corresponds to buildings. Another example layer corresponds to topographical features such as hills, mountains, rivers, or lakes. Another example layer corresponds to points of interest. Another example layer corresponds to live data such as traffic or weather. FIG. 3 illustrates map tile 131a-c having vertical layers for road segments, and a map tile 131d having vertical layers for road segments and buildings 132.

In another scenario, the horizontal layers may be divided according to navigable characteristics, cartographic characteristics, visual characteristics, and points of interest. The points of interest may include business names that are stored in a table in the database. Similarly, the point of interest data may include addresses that are associated with business names stored in a table in the databases. The business names associated with addresses may also include geographic coordinates indicating where in a map to locate the point of interest associated with the business name. The point of interest data may also include names of landmarks that are of particular interest to a user, such as hotels, restaurants, gas stations, stores, shopping centers, landmarks, natural features (e.g., a canyon, or mountain) or other combinations thereof. Additionally, the point of interest may be stored by category rather than business name. The visual characteristics include the graphics and indicators used to draw the other components of the map.

The visual characteristics include components, areas, layers, features, text, and/or symbols. The characteristics may be organized as geometric characteristics and non-geometric characteristics. A geometric characteristic is displayed on a map according to one or more coordinates (e.g., longitude and latitude). Non-geometric characteristics describe features (e.g., speed limits, colors, hours of operation, turn restrictions or others).

The navigable characteristics may include locations of road segments or other objects in the database. The navigable characteristics contribute to location selection, route calculation or route guidance. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends.

The cartographic characteristics are data structures that relate to land use, natural features, railroads, administrative/political divisions, or other boundaries. The cartographic characteristics or features may include rivers, mountain ranges, lakes, city lines, state boundaries, or any other data shown on the map besides the road network and points of interest.

A map user or developer may request a map tile or a set of map tiles defined by the horizontal layer across one or more the vertical layers. The horizontal layer may be requested using geographic boundaries, or a map tile identifier corresponding to geographic boundaries or a geographic area. The vertical layer may be requested based on vertical layer codes or the corresponding types of data. Every map tile may exist in several versions.

The geographic databases 123a-n or data sets may be indexed according to a version identifier. The version identifier reflects the state of the map. The version identifier may be a global index. That is, the same version identifier is used to describe the geographic database as well as the map tiles making up that geographic database. The global index may be consistent throughout horizontal layers and vertical layers.

Figures 5A, 5B:
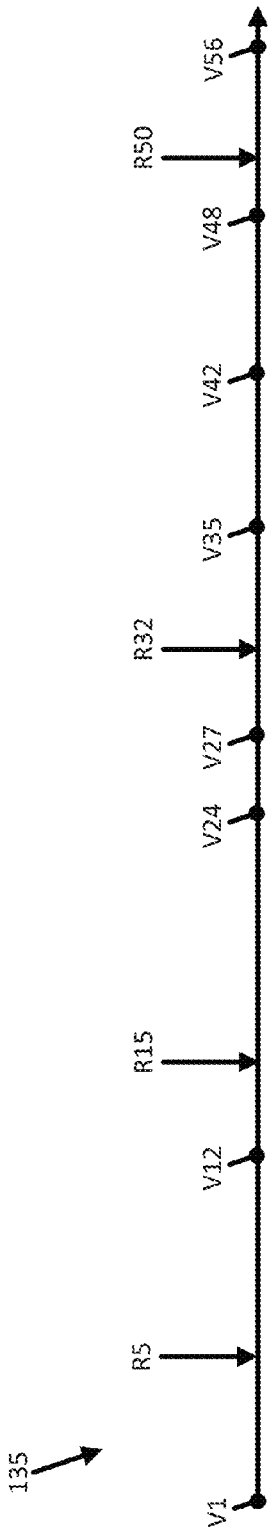
FIG. 5A illustrates an example sequential diagram for map versions.
FIG. 5B illustrates an example version compatibility chart from the sequential diagram of FIG. 5A.

FIG. 5A illustrates the global index for the geographic databases. In this example, the global index extends from version one (V1) to version 56 (V56). Every successful update transaction increments the global index. For example, the server 125 assigns the single monotonically ascending map version number to a map starting from an initial value (e.g., V0 or V1). The server 125 increments the map version number in response to an update to any tile or set of tiles of the map and assigns the map tile a version corresponding to the single monotonically ascending map version number for the map when the map tile is updated or created.

Also, illustrated with the global index, is the version history 135 for a particular map tile. This particular map tile was updated at versions 12, 24, 27, 35, 42, 48, and 56 of the geographic database. In other words, the first version of the map tile was V1, the second version was V12, the third was V24, and so on. Thus, V1 for this map tile is compatible with the map data with version identifiers from V1 to V11. Likewise, V27 for this map tile is compatible with the map data with version identifiers from V27 to V34.

FIG. 5A also illustrates requests for map data. A request for the map tile compatible with version 5 of the global index is designated as R5. Similar requests for the map tile at versions 15, 32, and 50 are designated R15, R32, and R50, respectively. The request R5 returns V1 of the map tile because V1 is valid from V1 to V11. The request R15 returns V12 of the map tile because V12 is valid from V12 to V23. The request R32 returns V27 of the map tile because V27 is valid from V27 to V34. The request R50 returns V48 of the map tile because V48 is valid from V48 to V55.

FIG. 5B illustrates an example version compatibility table 139 from the sequential diagram of FIG. 5A. Continuing the example above, the version compatibility table 139 illustrates that when the map tile data for global index V5 is requested for this map tile, the map tile layer version is V1, which indicates the most recent earlier version of the map tile. The version compatibility table 139 illustrates that when the map tile data for global index V5 is requested for this map tile, the compatible tile layer version is V11, which indicates that the same version of the map tile may be for version up to V11. The version compatibility table 139 also indicates a range from a minimum chronological version identifier prior to a version listed in the request and a maximum chronological version identifier subsequent to the version listed in the request. The server 125 is configured to build the version compatibility table 139 and access the version compatibility table 139 based on map related requests.

In one embodiment, the server 125 queries the version compatibility table 139 for a set of tiles from one or more layers for a specific global map version. The server 125 may receive a request for map data from a user of mobile device 122 or the workstation 128. The request may list one or more tile identifiers selected based on a geographic area. The tile identifiers may be an alphanumeric code. The tile identifiers may include geographic coordinates.

The request may be generated as part of a mapping application. For example, the workstation 128 or the mobile device 122 may present a website or another type of application that presents a map to the user. As the user scrolls the map to different geographic locations, requests are generated for the map tiles associated with the geographic locations. The request may be generated as part of a navigation application. As the mobile device 122 travels through a geographic area, requests are generated for the map tiles associated with the geographic locations.

The request may contain a version number. The version number may be based on other map tiles in the mapping application or the navigation application. For the example, the workstation 128 or mobile device 122 may identify a local map version of the geographic database 124. In another example, the version number of tiles adjacent to the tile of the request are examined. The adjacent tiles may all be of the same version number. In other examples, the adjacent tiles may have different version numbers. The mode or most common version number may be selected for the request. In another example, the latest map version can be used.

The request for map data may include a vertical layer code. A variety of techniques may be used to define the vertical layer codes. One example technique may assign code A to roads and other pathways, assign code B to buildings and other structure footprints, and assign code C to points of interest and other business names. The vertical layer code may refer to multiple vertical layers.

In response to receipt of the request, the server 125 may access the tile compatibility table 139 with the tile identifier. The tile compatibility table 139 includes tile version identifiers for the map tile indexed by global map version identifiers. The tile compatibility table 139 may return a compatible tile identifier to the server 125. The compatible tile identifier may be a version of the current tile that is compatible with the requested version number.

The tile compatibility table 139 may return data indicative of range of map versions that are compatible with the version in the request for map data. The range of compatible map versions may include a minimum chronological version identifier and a maximum chronological version identifier.

The server 125 may send the compatible tile and the compatible map version to the mobile device 122 or the workstation 128 in response to the request for map data. The compatible tile and the compatible map version may be packed in a response package.

After receiving the response package, the mobile device 122 or the workstation 128 may provide data through the mapping application or the navigation application. The mobile device 122 or the workstation 128 may compare a local version (cached version) of the map tile in geographic database 124 to compatible map version range in the request. If the local version is within the compatible map version range, the mobile device 122 or the workstation 128 may continue providing data in the mapping application or the navigation application.

If the local version is outside of the compatible map version range, the mobile device 122 or the workstation 128 may not provide the data in the mapping application or the navigation application. When the network 127 is available, an updated map tile may be downloaded. However, when the network 127 is not available because the mobile device 122 is out of range or for other reasons, an updated map tile cannot be downloaded. In one example, a message is displayed to the user indicating that the application is unavailable because of missing data. In one example, the application may pause until the network 127 becomes available. In one example, a message is displayed providing the option to proceed with incompatible data but warn that errors may result.

In another embodiment, the endpoint (e.g., the mobile device 122 or the workstation 128) directly accesses the tile compatibility table 139. The endpoint may store the tile compatibility table 139. The tile compatibility table 139 may have been downloaded ahead of time. Thus, when the endpoint receives a request for map data from the mapping application or the navigation application, the endpoint accesses the tile compatibility table 139 with the tile identifier from the request. Based on the tile compatibility table 139, the endpoint determines that the current local version of the tile is compatible with the requested one (e.g., included in the range of compatible map versions). The endpoint provides the compatible tile and the compatible map version to the mapping application or the navigation application in response to the request for map data.

The mobile device 122 may be a personal navigation device ("PND"), a portable navigation device smart phone, a mobile phone, a personal digital assistant ("PDA"), a car, a tablet computer, a notebook computer, and/or any other known or later developed connected device or personal computer. Non-limiting embodiments of navigation devices may also include relational database service devices, mobile phone devices, or car navigation devices.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

FIG. 6A illustrates a set of overlapping sequential diagrams for map versions. One of the diagrams is associated with a first map tile 135A, and one of the diagrams is associated with a second map tile 135B3. Segments 13a-k illustrate the overlapping portions between the map tiles 135A and 135B. For example, from V1 to V7, segment 13a indicates that both tiles use V1. At V8, the map tile for the map tile 135B3 was updated to V8. Thus, from V8 to V11, segment 13b indicates that V8 of map tile 135B is compatible with V1 of map tile 135A. Likewise, from V12 to V14, segment 13c indicates that V8 of map tile 135B is compatible with V12 of map tile 135A. Likewise, from V15 to V23, segment 13d indicates that V15 of map tile 135B is compatible with V12 of map tile 135A, from V24 to V26, segment 13e indicates that V15 of map tile 135B is compatible with V24 of map tile 135A, from V27 to V34, segment 13f indicates that V15 of map tile 135B is compatible with V38 of map tile 135A, from V35 to V37, segment 13g indicates that V15 of map tile 135B is compatible with V35 of map tile 135A, from V38 to V41, segment 13h indicates that V38 of map tile 135B is compatible with V35 of map tile 135A, from V27 to V34, segment 13i indicates that V38 of map tile 135B is compatible with V42 of map tile 135A, and other relationships are shown in FIG. 6A.

FIG. 6B illustrates a chart 140 for the overlapping sequential diagrams of FIG. 6A. A few examples are included in the chart 140. The chart 140 lists overlapping range V8-V11 for the situation when V1 of the first tile 135A is compatible with V8 of the second tile 135B, overlapping range V12-V14 for the situation when V12 of the first tile 135A is compatible with V8 of the second tile 135B, overlapping range V15-V23 for the situation when V12 of the first tile 135A is compatible with V15 of the second tile 135B, and overlapping range V24-V26 for the situation when V24 of the first tile 135A is compatible with V15 of the second tile 135B.

Figure 7:
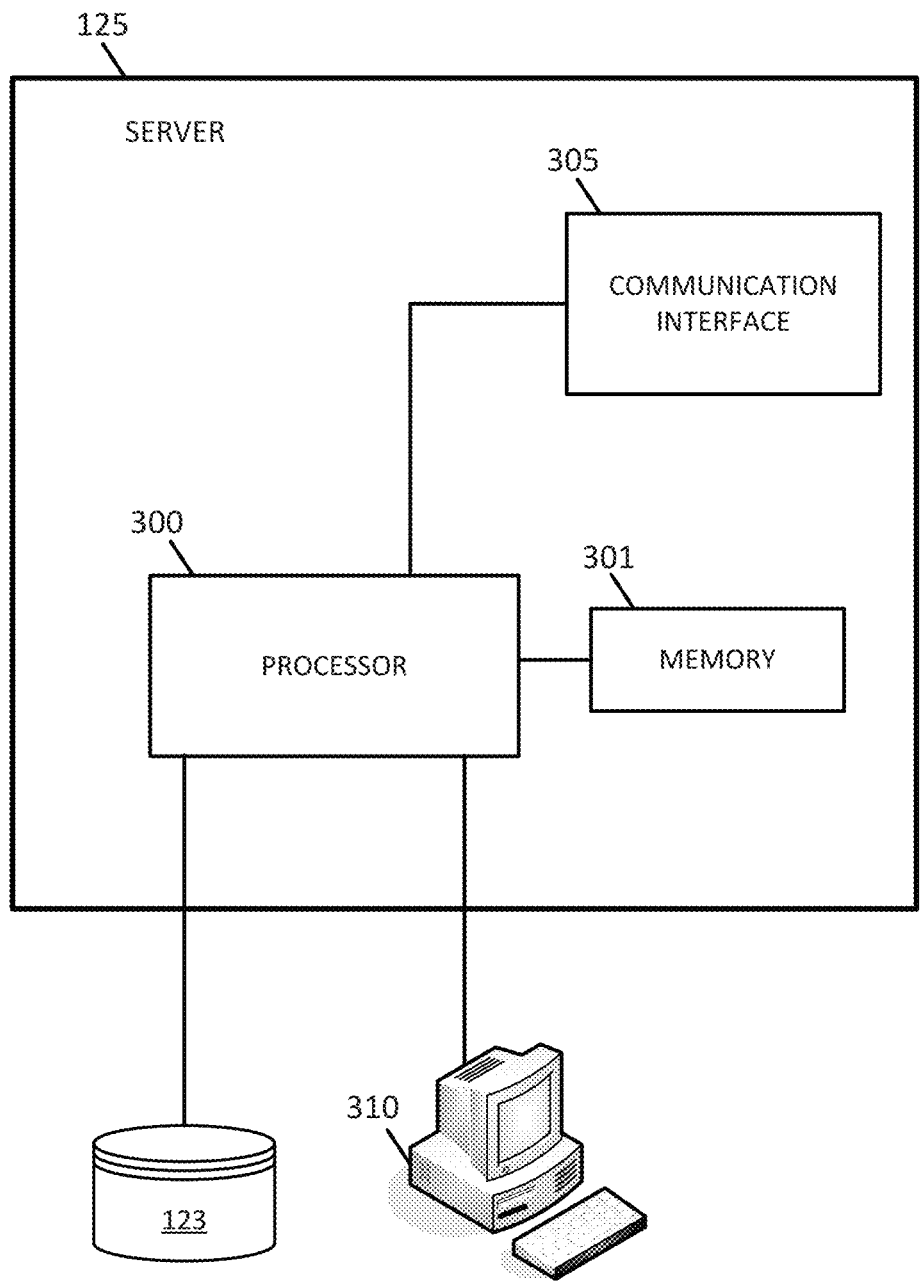
FIG. 7 illustrates an example server of the system for map version management.

FIG. 7 illustrates an example server 125. The server 125 includes a processor 300, a communication interface 305, and a memory 301. The server 125 may be coupled to a database 123 and a workstation 310. The workstation 310 may be used to enter data regarding the compatibility of map tiles, the compatible ranges for map tiles, and the layers assigned to map tiles. The database 123 may include a versioned map data partitioned by layers and tiles as discussed above. Additional, different, or fewer components may be provided in the server 125. FIG. 6 illustrates an example flowchart for the operation of server 125. Additional, different, or fewer acts may be provided.

In act S101, the processor 300 or the communication interface 305 receives a request for a map tile. The request may be received from an API. The request may be received from a user input on a website. For example, the user may request a map or routing on the website. The request may be received from a mobile device and be based on the current geographic location of the mobile device. The request includes a tile identification code or number (ID), layer and version number. One or more of this data may be included in corresponding fields of a versioning schema. The tile ID defines geographic area for the map tile. The map tile may be selected based on scrolling a map display. The map tile may be selected based on a route from an origin to a destination. The request may list multiple map tiles from the route or all of the map tiles for the route. The request for a map tile may include the tile identifier for the map tile and additional tile identifiers for one or more adjacent tiles. The layer defines the type of information that requester is interested in, for example, road topology, road geometry and a list of POIs along the road. Finally, the version defines the version of the map that the client is working with.

In act S103, the processor 300 access the tile compatibility lookup table for the map tile from the memory 301 or another metadata storage medium. The compatibility lookup table defines version histories for multiple map tiles. The multiple tiles may be defined on a single index of version numbers.

In act S105, the processor 300 or the communication interface 305 receives a range of compatible map versions from the tile compatibility table. Thus, based on the received tile identifier or version number, the processor 300 identifies a range of version numbers that are compatible with the map tile described in the request. The communication interface 305 may send the range of version numbers to the requestor.

In act S107, the processor 300 provides geographic data including the map tile based on the range of compatible map versions. In another example, the processor 300 may provide a replacement map tile when a cached tile is outside of the range of compatible map versions. The processor 300 may send a notice to the requestor that a map update is needed when a cached tile is outside of the range of compatible map versions.

The geographic databases 123a-n contains compiled map data that may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The data store contains geographic data compiled to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation.

Figure 8:
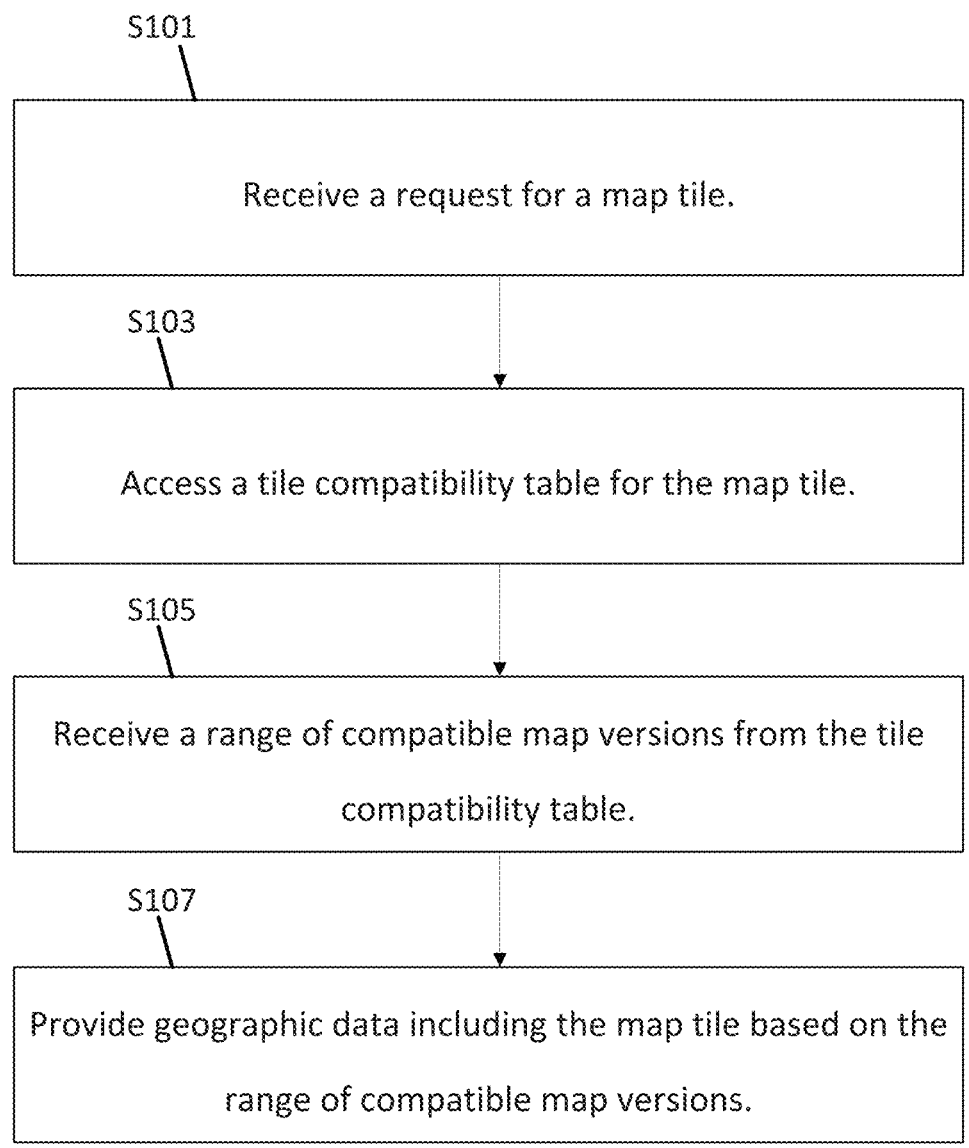
FIG. 8 illustrates an example flowchart for the server of FIG. 7.
Figure 9:
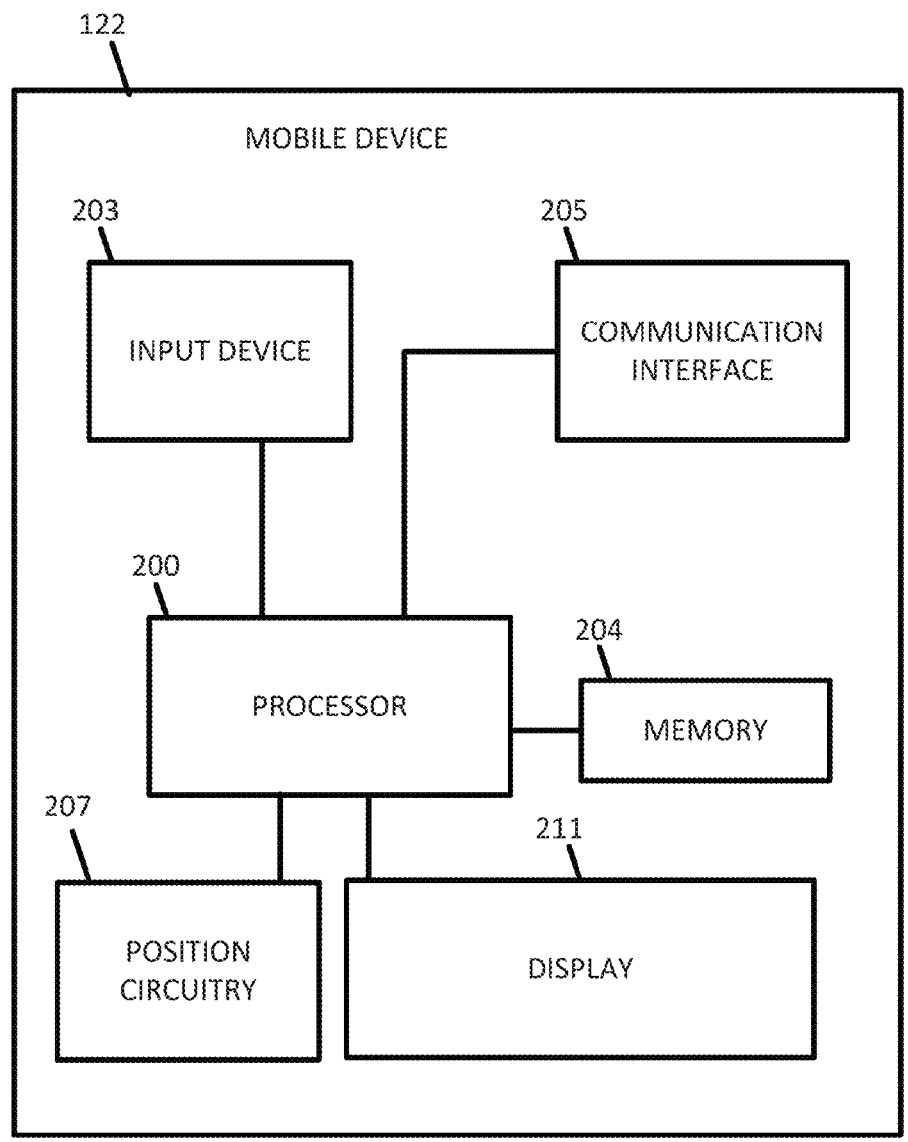
FIG. 9 illustrates an example mobile device in the system for map version management.
Figure 10:
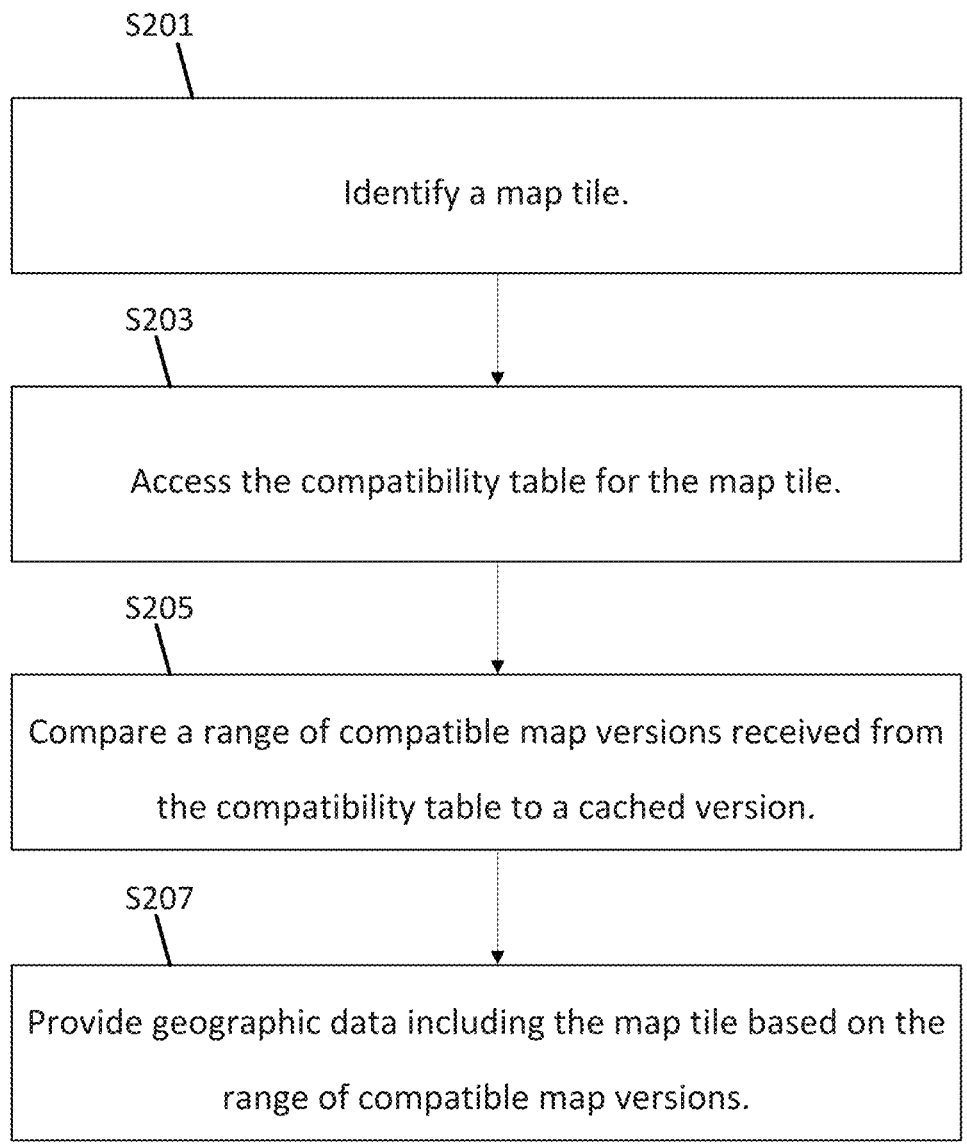
FIG. 10 illustrates an example flowchart for the mobile device of FIG. 8.

FIG. 7 illustrates an exemplary mobile device 122 of the system of FIG. 1. The mobile device 122 includes a processor 200, a memory 204, an input device 203, a communication interface 205, position circuitry 207, and a display 211. Additional, different, or fewer components are possible for the mobile device 122. FIG. 8 illustrates an example flowchart for the operation of the mobile device 122. Additional, different, or fewer acts may be used.

The mobile device 122 (or navigation device 122) is configured to execute routing algorithms to determine an optimum route to travel along a road network from an origin location to a destination location in a geographic region. Using input from the end user, the navigation device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some navigation devices 122 show detailed maps on displays outlining the route, the types of maneuvers to be taken at various locations along the route, locations of certain types of features, and so on.

At act S201, the processor 200 identifies a map tile. The map tile may be identified based on location data received from the position circuitry 207. The map tile may be identified based on a user input from the input device 123. For example, the user input may request a map of a particular geographic area. Or scroll from one area of the map to another area of the map. The user input may request routing from one location to another location, and the processor 200 selects the map tiles that make up the route.

At act S203, the processor 200 accesses a compatibility table including local versioning information for the map tile received in act S201. The local tile versioning information may be downloaded from the server 125, and may contain the map tiles currently available in the cache and ranges of version compatibilities That is, the map tiles may be index on a master version history numbering scheme, and the compatibility table lists compatible version numbers for multiple map tiles on that numbering scheme.

At act S205, the processor 200 compares a range of compatible map versions from the compatibility table to a cached version. For example, the processor 200 may access a cached copy of the map tile from memory 201 and retrieve a version number for the cached copy, which is on the master version history numbering scheme. The processor determines whether the version number of the cached copy falls with the range of compatible map version received from the compatibility table. Thus, the The processor 200 checks whether the required tile exists in the cache and is compatible with the surrounding tiles. At act S207, the processor 200 provides geographic data including the map tile based on the range of compatible map versions. For example, when the version of the cached map tile, falls with the range, the processor 200 provides geographic data using the cached map tile. The geographic data may be a map or a route presented on display 211. When the version of the cached map tile falls outside of the range, the processor 200 may request an update from the server 125.

When a network connection is available to the server 125, the updated map tile may be immediately downloaded, and incorporated in the map or the route presented on the display 211. However, when the network connection is unavailable or limited, the processor 200 may provide an error message on the display 211. The error message may state that incompatible map data is present and the geographic data cannot be presented. Alternatively, the error message may inform the user to obtain a network connection before the geographic data can be provided. In another example, the error message may provide the option of using the incompatible map tile and explain the risks of doing so.

In one example, when network connectivity is unavailable, the processor 200 may select a route based on the compatibility between the cached tile and adjacent tiles. When the compatibility table indicates that the cached map tile is unavailable, the processor 200 selects an alternative route to the destination. The processor 200 may identify one or more map tiles from the alternative route and query the compatibility table accordingly. The processor 200 may repeat this process until an alternative route the destination having compatible map tiles in the cache is identified.

The navigation device 122 is also configured to execute an update script or other type of navigation patch on local map data. The navigation device 122 receives the update script from the server 125 by way of network 127. The processor 200 may request updates in response to a user command entered on the input device 203 or receive periodic updates. In one example, the processor 200 may determine when to request a map update based on the map compatibility table. For example, rather than receiving map updates when they become available or on a schedule, the processor 200 may decline offers for map updates until the map compatibility table reveals that a map application or a navigation application running on the mobile device 122 has identified a map tile that is not compatible when other map tiles in the cache. Thus, the mobile device 122 can avoid map updates until they are necessary. The update script may be stored in a computer readable medium coupled to the server 125 or the navigation device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    receiving a request for map data for a tile associated with a first tile identifier;
    accessing, by a processor, a tile compatibility table with the first tile identifier, wherein the tile compatible table includes a plurality of tile version identifiers for the tile indexed by a single monotonically ascending map version number;
    receiving a second tile identifier from the tile compatibility table;
    receiving data indicative of a compatible map version from the tile compatibility table, the data indicative of the compatible map version includes a first range of compatible map version identifiers from a first minimum chronological version identifier to a first maximum chronological version identifier for the first tile identifier,
    the data indicative of a compatible map version includes a second range of compatible map version identifiers from a second minimum chronological version identifier to a second maximum chronological version identifier for the second tile identifier,
    and providing the first range of compatible map version identifiers from the first minimum chronological version identifier to the first maximum chronological version identifier for the first tile identifier and the second range of compatible map version identifiers from the second minimum chronological version identifier to the second maximum chronological version identifier for the second tile identifier, in response to the request for map data.

2. The method of claim 1, further comprising:
    assigning the single monotonically ascending map version number to a map starting from an initial value;
    incrementing the map version number in response to an update to any tile or set of tiles of the map; and
    assigning the map tile a version corresponding to the single monotonically ascending map version number for the map when the map tile is updated or created.

3. The method of claim 1, wherein the request for map data includes a vertical layer code.

4. The method of claim 1, wherein the request for map data includes geographic coordinates for a geographic area, the method further comprising:
    selecting the tile version identifier based on the geographic area.

5. The method of claim 4, wherein a plurality of tile version identifiers are selected based on the geographic area.

6. The method of claim 1, wherein a route is selected based on the compatible tile identifier and the compatible map version.

7. The method of claim 1, further comprising:
    reading the tile identifier from a versioning schema of the map tile; and
    receiving a map update request based on the compatible map version derived from the tile identifier.

8. The method of claim 1, further comprising:
    receiving a command declining a map update based on the compatible version.

9. An apparatus comprising:
    at least one processor; and
    at least one memory including computer program code for one or more programs; the at least one memory and the computer program code configured to, with the at least one processor, cause the apparatus to at least perform:
    receive a request for map data for a tile indexed by a first tile version identifier;
    access a tile compatibility table with the tile version identifier, wherein the tile compatible table includes a plurality of tile version identifiers for the tile indexed by global map version identifiers;
    receive a second tile version from the tile compatibility table;
    receive data indicative of a compatible map version from the tile compatibility table, the data indicative of the compatible map version includes a first range of compatible map version identifiers from a first minimum chronological version identifier to a first maximum chronological version identifier for the first tile identifier,
    the data indicative of a compatible map version includes a second range of compatible map version identifiers from a second minimum chronological version identifier to a second maximum chronological version identifier for the second tile identifier; and
    send the second tile version and the compatible map version in response to the request for map data.

10. A method comprising:
    receiving a request for map data for a tile indexed by a tile identifier;
    accessing, by a processor, a tile compatibility table with the tile identifier, wherein the tile compatible table includes a plurality of tile version identifiers for the tile indexed by global map version identifiers;
    receiving a range of compatible global map version identifiers from the tile compatibility table;
    accessing a stored version of the tile from memory;
    performing a comparison of the range of compatible global map version identifiers to the stored version; and
    providing the requested map data based on the comparison.

11. The method of claim 10, wherein providing the requested map data based on the comparison comprises:

generating a route from an origin to a destination when the comparison indicates that the stored version of the tile is in the range of compatible global map version identifiers.

12. The method of claim 11, further comprising:
generating a request for a map update when the comparison indicates that the stored version of the tile is out of the range of compatible global map version identifiers.

13. The method of claim 10, wherein providing the requested map data based on the comparison comprises:
declining a map update option when the comparison indicates that the stored version of the tile is in the range of compatible global map version identifiers.

14. The method of claim 10, wherein providing the requested map data based on the comparison comprises:
determining, based on the comparison, whether a cached map tile is sufficient to provide the requested map data.

15. The method of claim 10, wherein the range of compatible global map version identifiers includes a minimum chronological version identifier and a maximum chronological version identifier.

16. The method of claim 10, further comprising:
calculating a route from an origin to a destination, wherein the tile identifier corresponds to a first tile from the route and the stored version corresponds to a second tile from the route.

17. The method of claim 16, further comprising:
calculating an alternative route to the destination when the comparison indicates that the stored version is outside of the range of compatible global map version identifiers.

18. An apparatus comprising:
at least one processor; and
at least one memory including computer program code for one or more programs;
the at least one memory and the computer program code configured to, with the at least one processor, cause the apparatus to at least perform:
receive a request for map data for a tile indexed by a tile identifier;
access a tile compatibility table with the tile identifier, wherein the tile compatible table includes a plurality of tile version identifiers for the tile labeled by a single numbering scheme;
receive a range of compatible global map version identifiers from the tile compatibility table;
access a stored version of the tile from memory;
perform a comparison of the range of compatible global map version identifiers to the stored version; and
providing a navigation function based on the comparison.

19. The apparatus of claim 18, the at least one memory and the computer program code configured to, with the at least one processor, cause the apparatus to at least perform:
calculate a route based on the comparison.

20. A method comprising:
assigning a single monotonically ascending map version number to a map starting from an initial value;
incrementing the single monotonically ascending map version number in response to an update to any tile or set of tiles of the map;
assigning the map tile a version corresponding to the single monotonically ascending map version number for the map when the map tile is updated or created;
receiving a request for map data with a tile identifier;
accessing, by a processor, a tile compatibility table with the tile identifier, wherein the tile compatibility table includes a plurality of tile version identifiers for the tile indexed by the single monotonically ascending map version identifiers;
receiving a range of compatible map version identifiers for the tile identifier from the tile compatibility table, the range of compatible map version identifiers indexed by the single monotonically ascending map version number; and
providing the map data according to the range of compatible map version identifiers from the tile compatibility table.

* * * * *